(12) United States Patent
Viswanathan et al.

(10) Patent No.: US 10,853,572 B2
(45) Date of Patent: Dec. 1, 2020

(54) SYSTEM AND METHOD FOR DETECTING THE OCCUREANCES OF IRRELEVANT AND/OR LOW-SCORE STRINGS IN COMMUNITY BASED OR USER GENERATED CONTENT

(71) Applicant: Oracle International Corporation, Redwood Shores, CA (US)

(72) Inventors: Karthic Viswanathan, Karnataka (IN); Praneet Tiwari, Karnataka (IN); Kaushik Paul, Karnataka (IN); Anand Gomatam, Karnataka (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/243,591

(22) Filed: Apr. 2, 2014

(65) Prior Publication Data

US 2015/0039293 A1 Feb. 5, 2015

(30) Foreign Application Priority Data

Jul. 30, 2013 (IN) .......................... 3414/CHE/2013

(51) Int. Cl.
*G06F 40/284* (2020.01)
(52) U.S. Cl.
CPC ................. *G06F 40/284* (2020.01)
(58) Field of Classification Search
None
See application file for complete search history.

(56) References Cited

U.S. PATENT DOCUMENTS

| | | | | | |
|---|---|---|---|---|---|
| 5,682,543 | A | * | 10/1997 | Shiomi | G06F 40/247 715/246 |
| 5,812,863 | A | * | 9/1998 | Ishikawa | G06F 40/253 715/257 |
| 6,101,492 | A | * | 8/2000 | Jacquemin | G06F 16/3338 707/688 |
| 6,782,510 | B1 | * | 8/2004 | Gross | G06F 40/232 715/257 |
| 6,986,106 | B2 | * | 1/2006 | Soin | G06K 9/222 715/271 |

(Continued)

OTHER PUBLICATIONS

Benjamin Milde, "Crowdsourcing slang identification and transcription in twitter language," Gesellschaft fur Informatik (Hrsg.) Informatiktage 2013 (Mar. 22-23, 2013).*

(Continued)

*Primary Examiner* — Jonathan C Kim
(74) *Attorney, Agent, or Firm* — Tucker Ellis LLP (57) ABSTRACT

A system and method can detect and/or prevent profane/objectionable content in forums/communities with community based or user generated content. The system generates and provides a disallowed variants dictionary, which can be constructed based on a misuse table, wherein the disallowed variants dictionary contains a plurality of variants of one or more disallowed words in a community based or user generated content. Furthermore, the system checks each word in an incoming message against the disallowed variants dictionary, and determines that one or more words in the incoming message are disallowed when there is a hit.

20 Claims, 5 Drawing Sheets

(56) References Cited

U.S. PATENT DOCUMENTS

| | | | | |
|---|---|---|---|---|
| 7,003,725 | B2* | 2/2006 | Castellanos | G06F 40/247 715/257 |
| 7,664,812 | B2* | 2/2010 | Daniell | H04L 51/12 709/200 |
| 7,689,431 | B1* | 3/2010 | Carmel | G06F 40/253 705/1.1 |
| 7,739,289 | B2* | 6/2010 | McAllister | G06F 40/20 707/754 |
| 7,779,354 | B2* | 8/2010 | Ashcraft | G06F 40/232 715/257 |
| 8,201,086 | B2* | 6/2012 | Kritt | G06F 40/232 715/257 |
| 8,296,130 | B2* | 10/2012 | Spears | G06F 40/10 704/9 |
| 2002/0116629 | A1 | 8/2002 | Bantz et al. | |
| 2002/0173966 | A1* | 11/2002 | Henton | G10L 15/1815 704/277 |
| 2003/0014448 | A1* | 1/2003 | Castellanos | G06F 40/247 715/234 |
| 2003/0233235 | A1* | 12/2003 | Park | G06F 40/268 704/257 |
| 2005/0043949 | A1* | 2/2005 | Roth | G10L 15/14 704/251 |
| 2005/0091033 | A1* | 4/2005 | Valdes | G06F 40/232 704/5 |
| 2005/0169527 | A1* | 8/2005 | Longe | G06F 40/40 382/177 |
| 2005/0216256 | A1* | 9/2005 | Lueck | G10L 15/26 704/10 |
| 2005/0283364 | A1* | 12/2005 | Longe | G06K 9/00422 704/257 |
| 2006/0047760 | A1* | 3/2006 | Encinas | G06Q 10/107 709/206 |
| 2006/0253784 | A1 | 11/2006 | Bower et al. | |
| 2006/0265278 | A1* | 11/2006 | DiMeo | G06Q 30/0235 705/14.35 |
| 2007/0083369 | A1* | 4/2007 | McCuller | G10L 15/187 704/254 |
| 2008/0059876 | A1* | 3/2008 | Hantler | G06F 40/274 715/257 |
| 2008/0177834 | A1 | 7/2008 | Gruhl et al. | |
| 2009/0049513 | A1* | 2/2009 | Root | G06F 9/455 726/1 |
| 2009/0124272 | A1* | 5/2009 | White | G10L 15/193 455/466 |
| 2009/0182872 | A1 | 7/2009 | Hong | |
| 2009/0306969 | A1* | 12/2009 | Goud | G06F 40/242 704/10 |
| 2010/0174813 | A1* | 7/2010 | Hildreth | H04L 51/34 709/224 |
| 2010/0186088 | A1* | 7/2010 | Banerjee | H04L 63/1441 726/23 |
| 2011/0191105 | A1* | 8/2011 | Spears | G06F 40/10 704/251 |
| 2011/0219084 | A1* | 9/2011 | Borra | H04L 9/32 709/206 |
| 2012/0036147 | A1* | 2/2012 | Borst | H04L 51/12 707/769 |
| 2013/0027406 | A1* | 1/2013 | Liu | G06F 40/109 345/467 |
| 2013/0090917 | A1* | 4/2013 | Chalmers | G06F 40/166 704/9 |
| 2013/0138735 | A1 | 5/2013 | Kanter et al. | |
| 2014/0047315 | A1* | 2/2014 | Williams | G06F 40/169 715/230 |
| 2014/0278367 | A1* | 9/2014 | Markman | G06F 40/253 704/9 |

OTHER PUBLICATIONS

Milde (Benjamin Milde, "Crowdsourcing slang identification and transcription in twitter language," Gesellschaft fur Informatik (Hrsg.) Informatiktage 2013 (Mar. 22-23, 2013)).*

Yoon, Taijin, Sun-Young Park, and Hwan-Gue Cho. "A smart filtering system for newly coined profanities by using approximate string alignment." Computer and Information Technology (CIT), 2010 IEEE 10th International Conference on. IEEE, 2010.*

Wothke, K., Morphologically Based Automatic Phonetic Transcription, IBM Systems Journal, vol. 32, No. 3, 1993, http://citeseerx.ist.psu.edu/viewdoc/download?doi=10.1.1.94.2749&rep=rep1&type=pdf, pp. 486-511.

Sood, S. O. et al., Profanity Use in Online Communities, ACM, CHI (Conference on Human Factors in Computing Systems) 2012, May 5-10, 2012, http://labs.yahoo.com/files/profanity_chi.pdf, 10 pages.

Razavi, A. H. et al., Offensive Language Detection Using Multi-Level Classification (Abstract), AI 2010 Proceedings of the 23rd Canadian Conference on Advances in Artificial Intelligence, http://dl.acm.org/citation.cfm?id=2143649, 2 pages.

Bauemfeind, M., How to Filter and Moderate Usernames, Inversoft, http://www.inversoft.com/blog/2013/06/06/how-to-filter-and-moderate-usernames/#more-2449, downloaded Nov. 11, 2013, 3 pages.

Sood, S. O. et al., Using Crowdsourcing to Improve Profanity Detection, AAAI Technical Report SS-12-06, Wisdom of the Crowd, 2012, http://www.aaai.org/ocs/index.php/SSS/SSS12/paper/download/4256/4698, pp. 69-74.

* cited by examiner

SYSTEM AND METHOD FOR DETECTING THE OCCUREANCES OF IRRELEVANT AND/OR LOW-SCORE STRINGS IN COMMUNITY BASED OR USER GENERATED CONTENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims priority on an Indian Provisional Patent Application No. 3414/CHE/2013, entitled "SYSTEM AND METHOD FOR DETECTING THE OCCURRENCES OF IRRELEVANT AND/OR LOW-SCORE STRINGS IN COMMUNITY BASED OR USER GENERATED CONTENT" filed Jul. 30, 2013, which application is herein incorporated by reference.

FIELD OF INVENTION

The present invention is generally related to computer systems, and is particularly related to managing community based or user generated content.

BACKGROUND

Detecting and preventing profane/objectionable content has been a perpetual problem in computer science. Profane content on discussion boards and forums leads to direct and indirect losses for the organization hosting the forum. For example, the direct losses may come in the form of lowered relevance score by search engines and increased moderation costs, while the indirect losses are usually in the form of lowered good will among potential customers and decision makers. Thus, the profane content in a forum/discussion board may reduce the credibility and the goodwill of the company hosting the forum.

This is the general area that embodiments of the invention are intended to address.

SUMMARY

Described herein is a system and method that can detect and/or prevent profane/objectionable content in forums/communities with community based or user generated content. The system generates and provides a disallowed variants dictionary, which can be constructed based on a misuse table, wherein the disallowed variants dictionary contains a plurality of variants of one or more disallowed words in a community based or user generated content. Furthermore, the system checks each word in an incoming message against the disallowed variants dictionary, and determines that one or more words in the incoming message are disallowed when there is a hit.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

Described herein is a system and method that can detect/prevent profane/objectionable content.

A Parameterizable Online Algorithm

In accordance with an embodiment of the invention, a parameterizable online algorithm can be used to prevent an adversary from posting profane contents in forums/communities with community based or user generated content.

Figure 1:
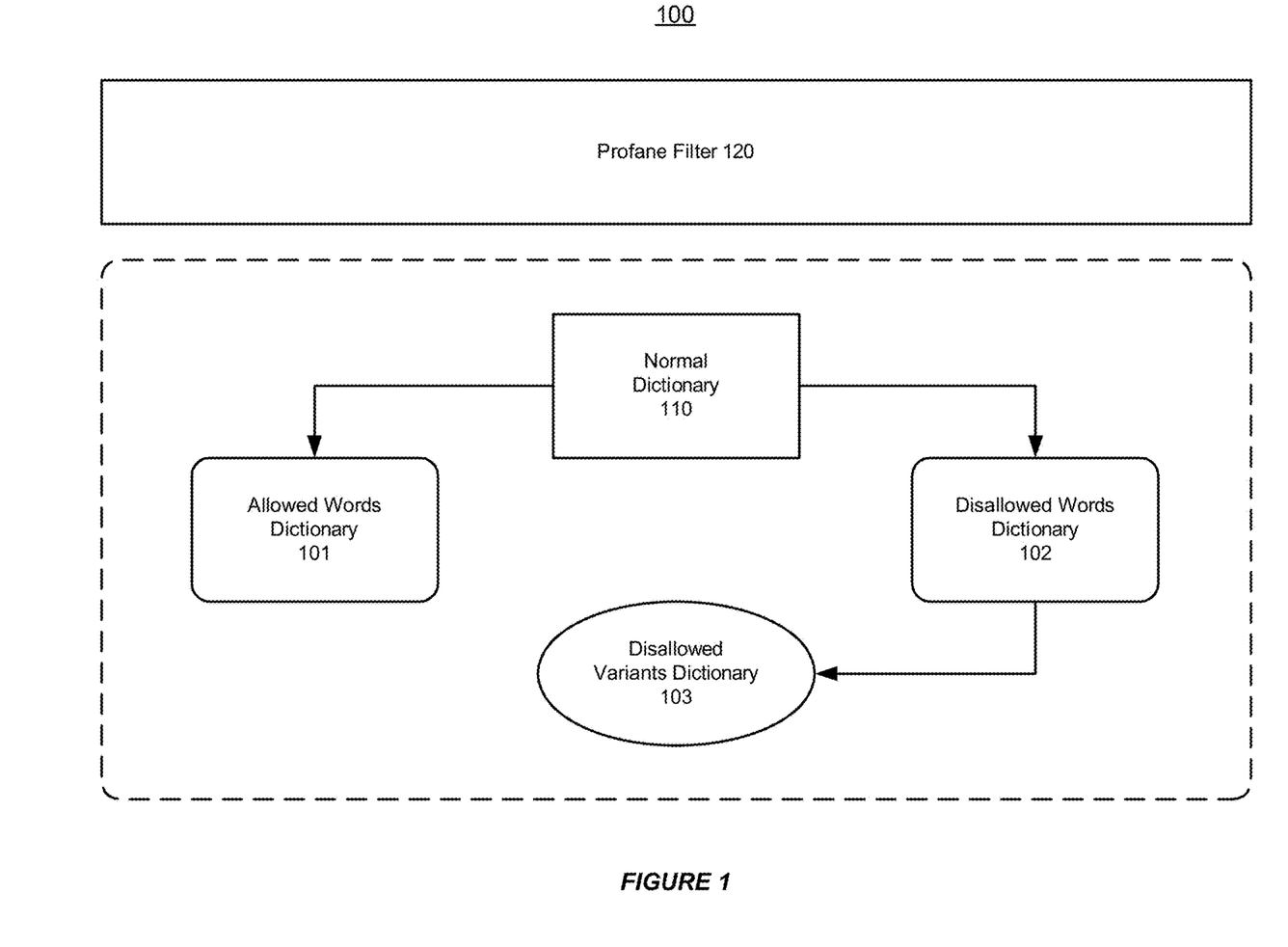
FIG. 1 shows an illustration of using different dictionaries to detect and prevent profane/objectionable content, in accordance with an embodiment of the invention.

FIG. 1 shows an illustration of using different dictionaries to detect and prevent profane/objectionable content, in accordance with an embodiment of the invention. As shown in FIG. 1, a content management environment 100 can include an allowed words dictionary 101 and a disallowed words dictionary 102. For example, the disallowed words dictionary 102 can be a black dictionary that contains all known profane words, and the allowed words dictionary 101 can be a white dictionary that is the normal English dictionary 110 with the words from the black dictionary removed.

Additionally, the content management environment 100 can include other types of dictionaries, such as a disallowed variants dictionary 103. For example, the disallowed variants dictionary 103 can be a grey dictionary that contains the morphological and phonetic variants of the words in the black dictionary.

Also as shown in FIG. 1, the system employs a profanity filter 120 for capturing the inappropriate contents. For example, the system can use a naive filter, which is based on the disallowed words dictionary 102, to detect/prevent direct profane contents. The naive filter can compare every single word entered by the adversary with the profane words contained in the disallowed words dictionary 102.

Furthermore, an adversary, who is aware of the naive filter, may try to circumvent the naive filter by typing in either a morphologically similar or a corrupted homonym. In order to handle this situation, the system can employ a more sophisticate profanity filter 120 for capturing the inappropriate contents.

In accordance with an embodiment of the invention, a profanity filter 120 can be based on the disallowed variants dictionary 103, in addition to the allowed words dictionary 101 and the disallowed words dictionary 102. Also, the system can employ an online algorithm, through which the words in any given forum message can be looked up for determining whether the message is inappropriate. Thus, the system can prevent the forum members from posting profane/inappropriate content, which may tarnish the goodwill that has been established by a forum or a corporation.

Figure 2:
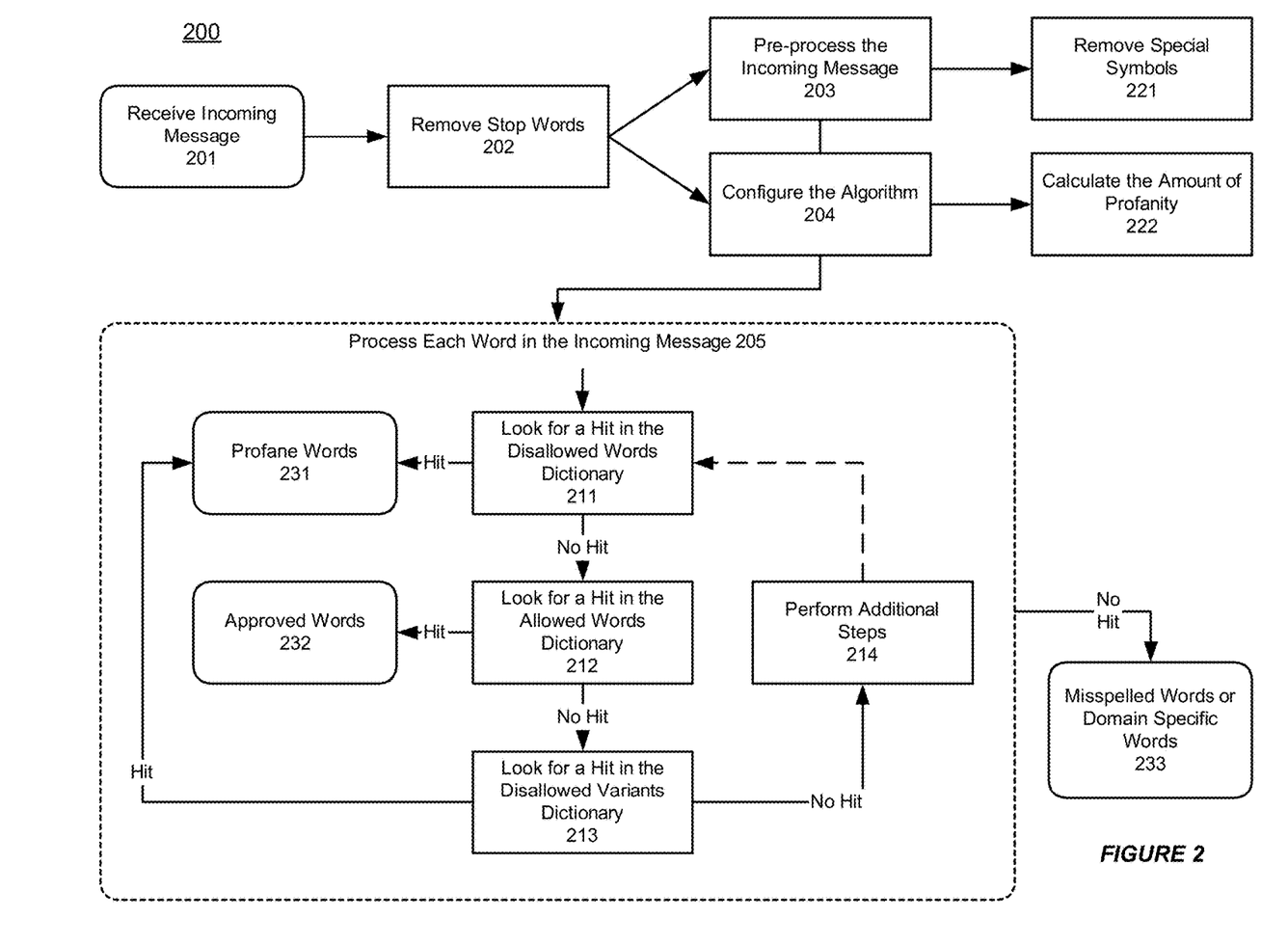
FIG. 2 shows an illustration of an algorithm for detecting profane/objectionable content in forums/communities with community based or user generated content, in accordance with an embodiment of the invention.

FIG. 2 shows an illustration of an algorithm for detecting profane/objectionable content in forums/communities with community based or user generated content, in accordance with an embodiment of the invention. As shown in FIG. 2, an online algorithm 200 can take advantage of different dictionaries in order to detect and/or prevent profane contents in forums/communities.

At step 201, the system can receive an incoming message. Then, at step 202, the online algorithm 200 removes all the stop words, such as articles, prepositions, from the incoming message.

Furthermore, at step 203, the online algorithm 200 can pre-process the incoming message 201. For example, at step 221 in the pre-process phase, the online algorithm 200 removes any special symbols that are put in by the adversary, in the case when the adversary tries to circumvent the profane filter by adding one or more special symbols amidst a profane word.

At step 204, the online algorithm 200 allows a user to configure the online algorithm 200. A user can configure the online algorithm 200 in order to adjust the level of filtering that can afford the best handling of different scenarios. For example, if the filtering is not needed, then the step 221 can be omitted. Otherwise, the filter can be configured to perform the step 221 in the pre-process phase, in order to defeat the cases where the adversary adds special symbols amidst the profane words in order to circumvent the filter.

Additionally, at step 222, a user can configure the algorithm 200 to calculate the amount of profanity in a given message and quantify the profanity in the incoming message (e.g. with the help of the white dictionary). Furthermore, depending on the profanity value, the system can decide whether to allow or disallow the message to be posted.

At step 205, after pre-processing the incoming message and configuring the online algorithm 200, the system processes each word in the incoming message based on the different dictionaries.

As shown in FIG. 2, at step 211, for each word in the incoming message, the online algorithm 200 can look for a hit in the disallowed words dictionary. If a hit is found, then the online algorithm 200 flags the word and concludes that the message contains profane content (step 231).

On the other hand, at step 212, if no hit is found in the disallowed words dictionary, the online algorithm 200 can look for a hit in the allowed words dictionary. If a hit is found, then the word is an allowed word (step 232).

Otherwise, at step 213, the online algorithm 200 can look for a match in the disallowed variants dictionary, which includes morphologically and phonetically similar words, in order to capture any misspellings or their variations in the profane content. In such a case, the system may find a hit if the adversary tried to circumvent the filter by modifying a profane word either morphologically or phonetically. Then, the online algorithm 200 can flag the word and conclude that the message contains profane content (step 231).

At step 214, if a match does not occur in any of the dictionaries, the online algorithm 200 can optionally perform additional steps that can defeat other potential approaches that may be employed by the adversary.

For example, a well known approach employed by the adversary is to repeat the characters in the profane words for an arbitrary number of times. The algorithm 200 can defeat such attempts by performing a rolling operation on repeated characters. Assuming 'hello' is a profane word, the algorithm 200 can catch a variant, such as 'hheeeeellooooo,' since the rolling operation can transform it into a string, 'helo'.

Furthermore, the online algorithm 200 can be case independent and is capable of catching words with capitalization at odd locations. For example, assuming 'hello' is a profane word, the algorithm is capable of catching all variants such as 'HelLo', 'heLlO', etc.

Also, the online algorithm 200 is capable of catching words with special characters, misspellings and variations. Thus, the online algorithm 200 can defeat different approaches used by the adversary to circumvent the content filters by inserting special characters amidst the regular words (e.g. h;e'l'&o).

Then, the online algorithm 200 can repeat the steps 211-213, where the online algorithm 200 can determine whether there is a profane word, based on whether a hit is found in either the disallowed words dictionary or the disallowed variants dictionary.

Finally, at step 233, there can be different scenarios when the word does not yield a hit in any of the dictionaries. One scenario is that the adversary may have misspelled a word, and another scenario is that the word can be a domain specific word.

In accordance with an embodiment of the invention, the system can perform most of the work in the pre-processing phase to minimize runtime overhead. Based on appropriate configuration, the words in the incoming message can be directly looked up in the dictionaries to determine whether the message is profane or not.

Thus, the system can support linear time in processing an incoming message and the work load for processing the incoming message may not be changed by the number of profane words. Also, since most works are done in the pre-processing phase and with minimal memory requirements, the algorithm is optimized both in time and memory space. Additionally, the system requires no human intervention.

Figure 3:
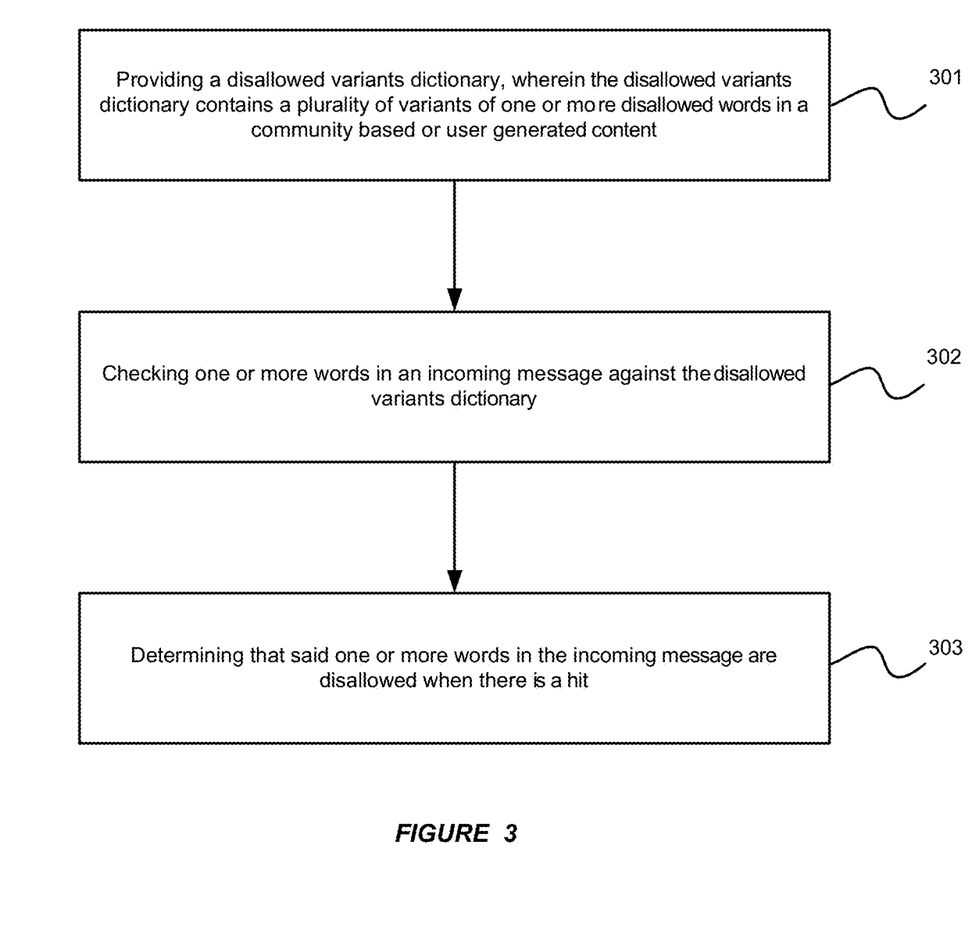
FIG. 3 illustrates an exemplary flow chart for detecting profane/objectionable content, in accordance with an embodiment of the invention.

FIG. 3 illustrates an exemplary flow chart for detecting profane/objectionable content, in accordance with an embodiment of the invention. As shown in FIG. 3, at step 301, the system provides a disallowed variants dictionary, wherein the disallowed variants dictionary contains a plurality of variants of one or more disallowed words in a community based or user generated content. Then, at step 302, the system checks one or more words in an incoming message against the disallowed variants dictionary. Furthermore, at step 303, the system determines that said one or more words in the incoming message are disallowed when there is a hit.

Look-Left Algorithm

In accordance with an embodiment of the invention, an algorithm, e.g. a look-left algorithm, can be used to generate the disallowed variants dictionary by using a misuse table that contains the morphological and the phonetic variants of the alphabets and syllables in the English language.

Figure 4:
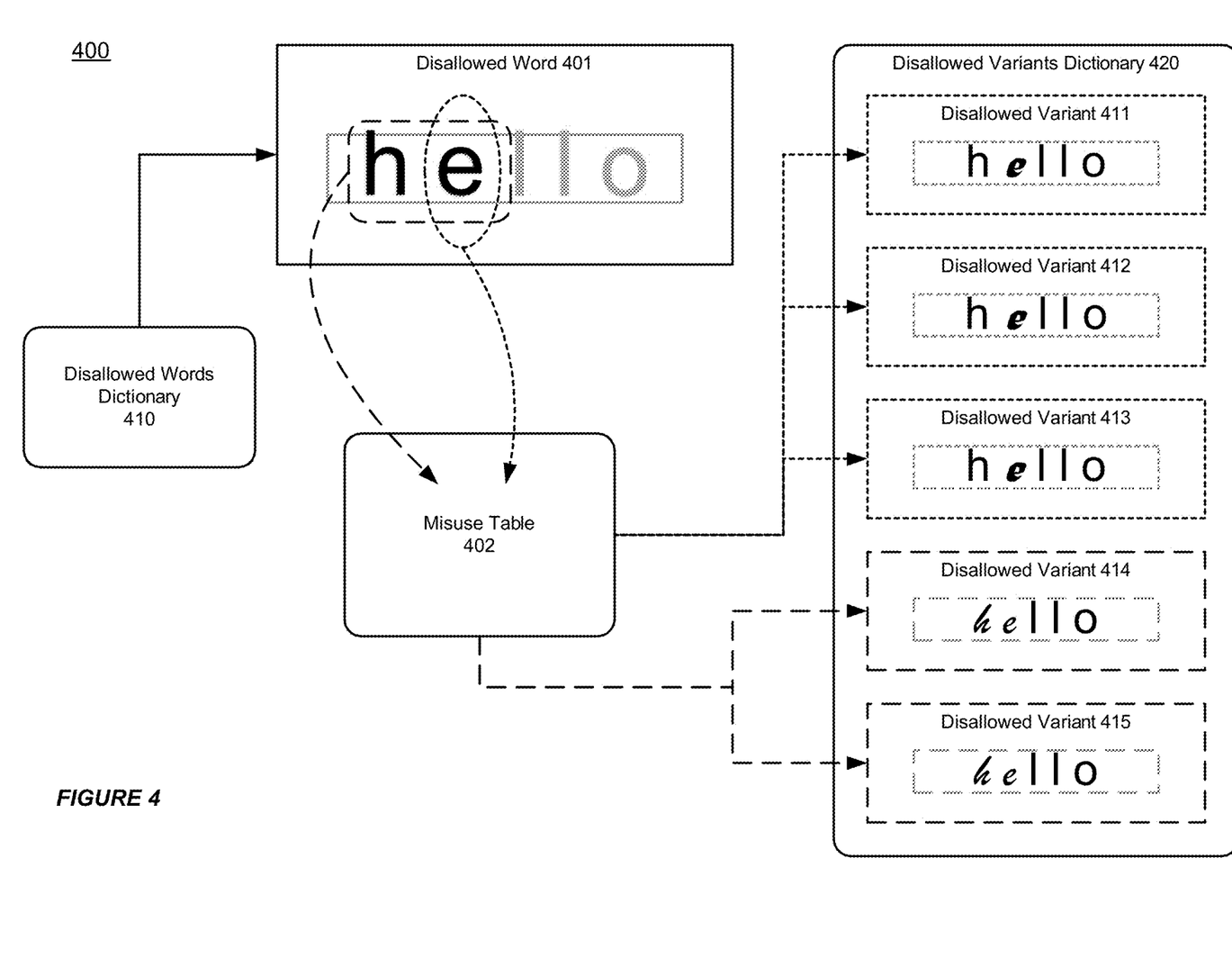
FIG. 4 shows an illustration of constructing a disallowed variants dictionary, in accordance with an embodiment of the invention.

FIG. 4 shows an illustration of constructing a disallowed variants dictionary, in accordance with an embodiment of the invention. As shown in FIG. 4, a look-left algorithm 400 constructs a disallowed variants dictionary 420 by analyzing each of the words in a disallowed words dictionary 410.

For example, the look-left algorithm 400 can be used to analyze the word 'hello,' which is assumed to be a disallowed word 401. For each character encountered in the disallowed word 401, the look-left algorithm 400 looks up in the misuse table 402 for the variants of the character. Then, the look-left algorithm 400 looks up in the misuse table 402 for the variants of the combination of the character and its left sibling characters.

As shown in FIG. 4, when the system is analyzing at the character 'e' in the word 'hello', the algorithm 400 looks up in the misuse table 402 for the variants of the character 'e'. Then, the algorithm 400 obtains one or more variants 411-413 of the word by expanding the word 'hello' by replacing the character with each of the variants from the misuse table 402. The newly generated variants 411-413 can be maintained in a set/tuple, which is a part of the disallowed variants dictionary 420.

Additionally, the algorithm 400 may also look for variants of the characters 'he' in the misuse table. If a hit occurs, the algorithm can obtain one or more variants 414-415 of the word by replacing the two characters with the variants from the misuse table and the newly generated variants 414-415 can be appended to the set/tuple.

Furthermore, the look-left algorithm 400 can proceed until reaching the end of the disallowed word 401. Then, the system can store all the generated variants 411-415, which are the variants of the disallowed word 401, in the disallowed variants dictionary 420.

Thus, the system can use the look-left algorithm 400 to process each word in the disallowed words dictionary 410, and construct the disallowed variants dictionary 420, which include all the variants for each word in the disallowed words dictionary 410.

In accordance with an embodiment of the invention, the algorithm 400 can be based on different types of misuse tables 402. The following Table 1 shows an exemplary misuse table.

TABLE 1

A Sample Misuse Table

| The alphabets and syllables | The morphological and the phonetic variants |
|---|---|
| c: | k, q, ck, ch |
| k: | c, q, kh, ck, ch |
| a: | @, er, ar, or, ur, re, u, e |
| er: | ar, or, ur, re |
| s: | $, 5, ps, z, x |
| x: | ax, ks, cs, ux, ex, khs |
| ks: | cs, ux, ex, ax, khs |
| o: | 0, oh, ou |
| g: | j, dg, dj |
| ew: | eu, yu, ieu, iu |

The above exemplary misuse table contains the morphological variants of the alphabets and syllables in the English language (such as 's' and '$', and '1' and '!'). Thus, the algorithm 400 can be used for defeating the attempt by an adversary to use 'leet' speak characters (e.g. '!' for i/1, 'O' for 'o', etc) instead of regular English alphabets in the profane words, by catching the similar looking words in the incoming message.

Additionally, the above exemplary misuse table contains the phonetic variants of the alphabets and syllables in the English language. For example, the phonetic variants (such as the characters q, k, c or x, cs, ks) can be generated using a consonant Chart, which is devised by the International Phonetic Association (IPA).

In accordance with an embodiment of the invention, the look-left algorithm 400 can take advantage of the IPA consonant chart, which is more reliable than other algorithms, such as the naive SoundEx algorithm, in catching phonetically similar words. For example, the naive SoundEx algorithm, which depends on the first character of the word, may fail when the adversary changes the first character of a profane word to another similar sounding character. Assuming 'fate' is a profane word, an adversary can change it to 'phate' to cause the SoundEx algorithm to fail, since the SoundEx code for 'fate' is F300 while the SoundEx code for 'phate' is P300.

Furthermore, the system can be extended to other natural languages, since IPA has designed consonant charts of most natural languages.

In accordance with an embodiment of the invention, the system can handle the disallowed words with high precision and the setup of the algorithm can be easily reused. Since the algorithm relies on the fact that the adversary may try to modify the message by typing in either a morphologically similar or a corrupted homonym, the generated variants are highly efficient and relevant. Also, the system supports low memory consumption. Since the variants generated are fewer than those used by the naive algorithms, the system can consume less memory and enjoys shorter dictionary look up.

Figure 5:
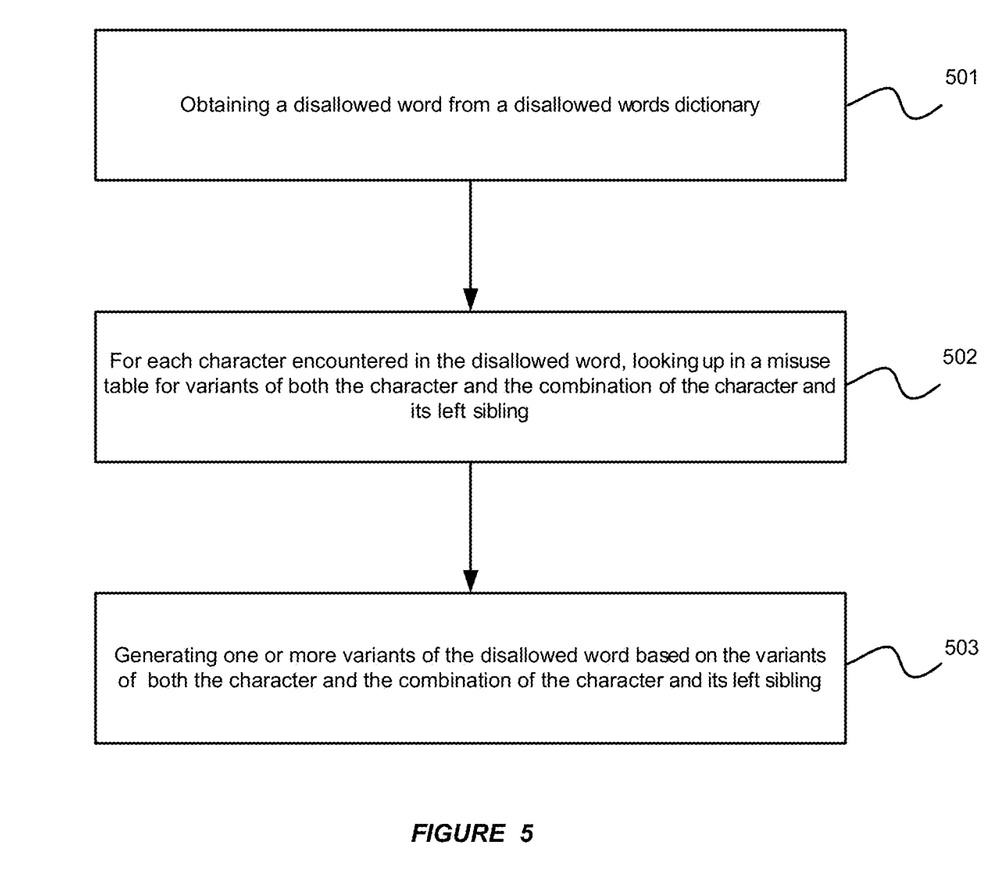
FIG. 5 illustrates an exemplary flow chart for constructing a disallowed variants dictionary, in accordance with an embodiment of the invention.

FIG. 5 illustrates an exemplary flow chart for constructing a disallowed variants dictionary, in accordance with an embodiment of the invention. As shown in FIG. 5, at step 501, the system can obtain a disallowed word from a disallowed words dictionary. Then, at step 502, for each character encountered in the disallowed word, the system can look up in a misuse table for variants of both the character and the combination of the character and its left sibling. Furthermore, at step 503, the system can generate one or more variants of the disallowed word based on the variants of both the character and the combination of the character and its left sibling.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modification and variation include any relevant combination of the described features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer-implemented method for posting user generated content and detecting profane/objectionable content, comprising:
   providing, at a computer server for user generated content that includes one or more microprocessors and memory, a profanity filter executing on the computer server which includes:
      a disallowed words dictionary which identifies a plurality of disallowed words;
      a disallowed variants dictionary which identifies a plurality of variants of the plurality of disallowed words in the disallowed words dictionary wherein each disallowed variant corresponds to a modified version of one of the plurality of disallowed words; and
      a misuse table which specifies morphological variants of characters and morphological variants of character pairs;
   generating, during a preprocessing phase, the disallowed variants dictionary from the disallowed words dictionary using the misuse table, by, for each of the plurality of words of the disallowed words dictionary, iteratively, for each character of each disallowed word of the plurality of disallowed words, performing the steps of:
   utilizing the misuse table to identify character variants for said each character;
   generating a first set of disallowed variants by substituting the character of the disallowed word with each of the one or more character variants identified with the misuse table;
   adding each disallowed variant of the first set of disallowed variants to the disallowed variants dictionary on said computer server;
   utilizing the misuse table to identify character pair variants for a character pair including said each character in combination with an immediately preceding character of the disallowed word;
   generating a second set of disallowed variants by substituting the character pair with character pair variants identified with the misuse table; and
   adding each disallowed variant of the second set of disallowed variants to the disallowed variants dictionary on said computer server;
   receiving, by the computer server during runtime, a plurality of messages from users; and
   for each of a plurality of words in each of the plurality of messages received during runtime, checking, by the computer server, said each word against the disallowed words dictionary and disallowed variants dictionary by directly looking up said each word in the disallowed words dictionary and disallowed variants dictionary, and determining that said each word is disallowed when there is a match;
   calculating a profanity score for each message of the plurality of messages based on disallowed words determined in said each message; and
   allowing or disallowing each message of the plurality of messages to be posted on the computer server based on the profanity score for said each message.

2. The computer-implemented method according to claim 1, further comprising:
   removing one or more stop words in the message.

3. The computer-implemented method according to claim 1, comprising performing the following steps in order for each of the plurality of words in each of the plurality of messages received during runtime:
   checking said each word against the disallowed words dictionary by directly looking up said each word in the disallowed words dictionary and determining that said each word is disallowed when there is a match;
   checking said each word not matched in the disallowed word dictionary against an allowed words dictionary by directly looking up said each word in the allowed words dictionary and determining that said each word is allowed when there is a match; and
   checking said each word not matched in the disallowed word dictionary and allowed words dictionary against the disallowed variants dictionary by directly looking up said each word in the disallowed variants dictionary and determining that said each word is disallowed when there is a match.

4. The computer-implemented method according to claim 3, further comprising:
   calculating the profanity score for each message of the plurality of messages based on disallowed words determined in said each message and allowed words determined in said each message.

5. The computer-implemented method according to claim 1, further comprising:
   receiving user input to configure filtering of the plurality of messages received during runtime; and
   pre-processing the plurality of messages by removing special characters from the plurality of words in each of the plurality of messages in response to said user input.

6. The method according to claim 1, further comprising:
   performing a rolling operation on repeated characters for said each word of the plurality of words in each of the plurality of messages received during runtime.

7. The computer-implemented method according to claim 1, further comprising:
   removing any special symbols in the message, or
   catching one or more words with capitalization at odd locations.

8. The computer-implemented method according to claim 1, wherein the disallowed variants dictionary includes one or more morphological and phonetic variants of said one or more disallowed words and one or more misspellings of said one or more disallowed words.

9. The computer-implemented method according to claim 1, wherein the misuse table further includes phonetic variants of characters based on a consonant chart to obtain one or more phonetically similar variants of said one or more disallowed words.

10. The computer-implemented method according to claim 1, wherein the disallowed variants dictionary includes one or more variants in different languages.

11. A system for posting user generated content and detecting profane/objectionable content, comprising:
    one or more microprocessors and memory;
    a computer server for user generated content, servers executing on the one or more microprocessors and memory; and
    a profanity filter executing on the computer server which includes:
       a disallowed words dictionary which identifies a plurality of disallowed words;
       a disallowed variants dictionary which identifies a plurality of variants of the plurality of disallowed words in the disallowed words dictionary wherein each disallowed variant corresponds to a modified version of one of the plurality of disallowed words; and a misuse table which specifies morphological variants of characters and morphological variants of character pairs;

wherein the computer server is configured to generate, during a preprocessing phase, the disallowed variants dictionary from the disallowed words dictionary, using the misuse table, by, for each of the plurality of words of the disallowed words dictionary, iteratively, for each character of each disallowed word of the plurality of disallowed words, performing the steps of:

utilizing the misuse table to identify character variants for said each character;

generating a first set of disallowed variants by substituting the character of the disallowed word with each of the one or more character variants identified with the misuse table;

adding each disallowed variant of the first set of disallowed variants to the disallowed variants dictionary on said computer server;

utilizing the misuse table to identify character pair variants for a character pair including said each character in combination with an immediately preceding character of the disallowed word;

generating a second set of disallowed variants by substituting the character pair with character pair variants identified with the misuse table; and adding each disallowed variant of the second set of disallowed variants to the disallowed variants dictionary on said computer server;

wherein the computer server receives, during runtime, a plurality of messages from users; and wherein, for each of a plurality of words in each of the plurality of messages received during runtime, the computer server checks said each word against the disallowed words dictionary and disallowed variants dictionary by directly looking up said each word in the disallowed words dictionary and disallowed variants dictionary, and determines that said each word is disallowed when there is a match;

wherein the computer server calculates a profanity score for each message of the plurality of messages based on disallowed words determined in said each message; and wherein the computer server one of allows or disallows each message of the plurality of messages to be posted on the computer server based on the profanity score for said each message.

12. The system according to claim 11, wherein the computer server further operates to remove one or more stop words in the message.

13. The system according to claim 11, wherein the computer server further operates to perform the following steps in order for each of the plurality of words in each of the plurality of messages received during runtime:

check said each word against the disallowed words dictionary by directly looking up said each word in the disallowed words dictionary and determine that said each word is disallowed when there is a match;

check said each word not matched in the disallowed word dictionary against an allowed words dictionary by directly looking up said each word in the allowed words dictionary and determine that said each word is allowed when there is a match; and check said each word not matched in the disallowed word dictionary and allowed words dictionary against the disallowed variants dictionary by directly looking up said each word in the disallowed variants dictionary and determine that said each word is disallowed when there is a match.

14. The system according to claim 13, wherein the computer server further operates to:

calculate the profanity score for each message of the plurality of messages based on disallowed words determined in said each message and allowed words determined in said each message.

15. The system according to claim 11, wherein the computer server further operates to:

receive user input to configure filtering of the plurality of messages received during runtime; and pre-process the plurality of messages by removing special characters from the plurality of words in each of the plurality of messages in response to said user input.

16. The system according to claim 11, wherein the computer server further operates to perform a rolling operation on repeated characters for said each word of the plurality of words in each of the plurality of messages received during runtime.

17. The system according to claim 11, wherein the computer server further operates to remove any special symbols in the message, or catch one or more words with capitalization at odd locations.

18. The system according to claim 11, wherein the disallowed variants dictionary includes one or more morphological and phonetic variants of said one or more disallowed words one or more misspellings of said one or more disallowed words, and one or more variants in different languages.

19. The system according to claim 11, wherein the misuse table further includes phonetic variants of characters based on a consonant chart to obtain one or more phonetically similar variants of said one or more disallowed words.

20. A computer-implemented method for posting user generated content and detecting profane/objectionable content, comprising:

providing, at a computer server for user generated content that includes one or more microprocessors and memory, a profanity filter executing on the computer server which includes:

a disallowed words dictionary which identifies a plurality of disallowed words;

a disallowed variants dictionary which identifies a plurality of variants of the plurality of disallowed words in the disallowed words dictionary wherein each disallowed variant corresponds to a modified version of one of the plurality of disallowed words; and a misuse table which specifies morphological variants of characters and morphological variants of character pairs;

generating, during a preprocessing phase, the disallowed variants dictionary from the disallowed words dictionary using the misuse table, by, for each of the plurality of words of the disallowed words dictionary, iteratively, for each character of each disallowed word of the plurality of disallowed words, performing the steps of:

utilizing the misuse table to identify character variants for said each character;

generating a first set of disallowed variants by substituting the character of the disallowed word with each of the one or more character variants identified with the misuse table;

adding each disallowed variant of the first set of disallowed variants to the disallowed variants dictionary on said computer server;

utilizing the misuse table to identify character pair variants for a character pair including said each character in combination with an immediately preceding character of the disallowed word;

generating a second set of disallowed variants by substituting the character pair with character pair variants identified with the misuse table; and adding each disallowed variant of the second set of disallowed variants to the disallowed variants dictionary on said computer server;

receiving, by the computer server during runtime, a plurality of messages from users; and for each of a plurality of words in each of the plurality of messages received during runtime, performing the following steps in order:

removing stop words from the message;

checking each remaining word against the disallowed words dictionary by directly looking up said each remaining word in the disallowed words dictionary and determining that said each remaining word is disallowed when there is a match;

checking said each remaining word not matched in the disallowed word dictionary against an allowed words dictionary by directly looking up said each word in the allowed words dictionary and determining that said each remaining word is allowed when there is a match; and checking said each remaining word not matched in the disallowed word dictionary and allowed words dictionary against the disallowed variants dictionary by directly looking up said each remaining word in the disallowed variants dictionary and determining that said each remaining word is disallowed when there is a match;

calculating a profanity score for each message of the plurality of messages based on allowed words and disallowed words determined in said each message; and posting or not posting each message of the plurality of messages on the computer server based on the profanity score calculated for said each message.

* * * * *

UNITED STATES PATENT AND TRADEMARK OFFICE
CERTIFICATE OF CORRECTION

| | | |
|---|---|---|
| PATENT NO. | : 10,853,572 B2 | Page 1 of 1 |
| APPLICATION NO. | : 14/243591 | |
| DATED | : December 1, 2020 | |
| INVENTOR(S) | : Viswanathan et al. | |

It is certified that error appears in the above-identified patent and that said Letters Patent is hereby corrected as shown below:

On the Title Page

In Column 1, under Title, Line 2, delete "OCCUREANCES" and insert -- OCCURRENCES --, therefor.

In the Specification

In Column 1, Line 2, delete "OCCUREANCES" and insert -- OCCURRENCES --, therefor.

In the Claims

In Column 8, Line 30, in Claim 6, after "The" insert -- computer-implemented --.

In Column 8, Line 55, in Claim 11, after "content," delete "servers".

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*